April 7, 1925.
J. A. MURDOCK
FUEL VALVE
Filed Feb. 19, 1923
1,532,512
2 Sheets-Sheet 1
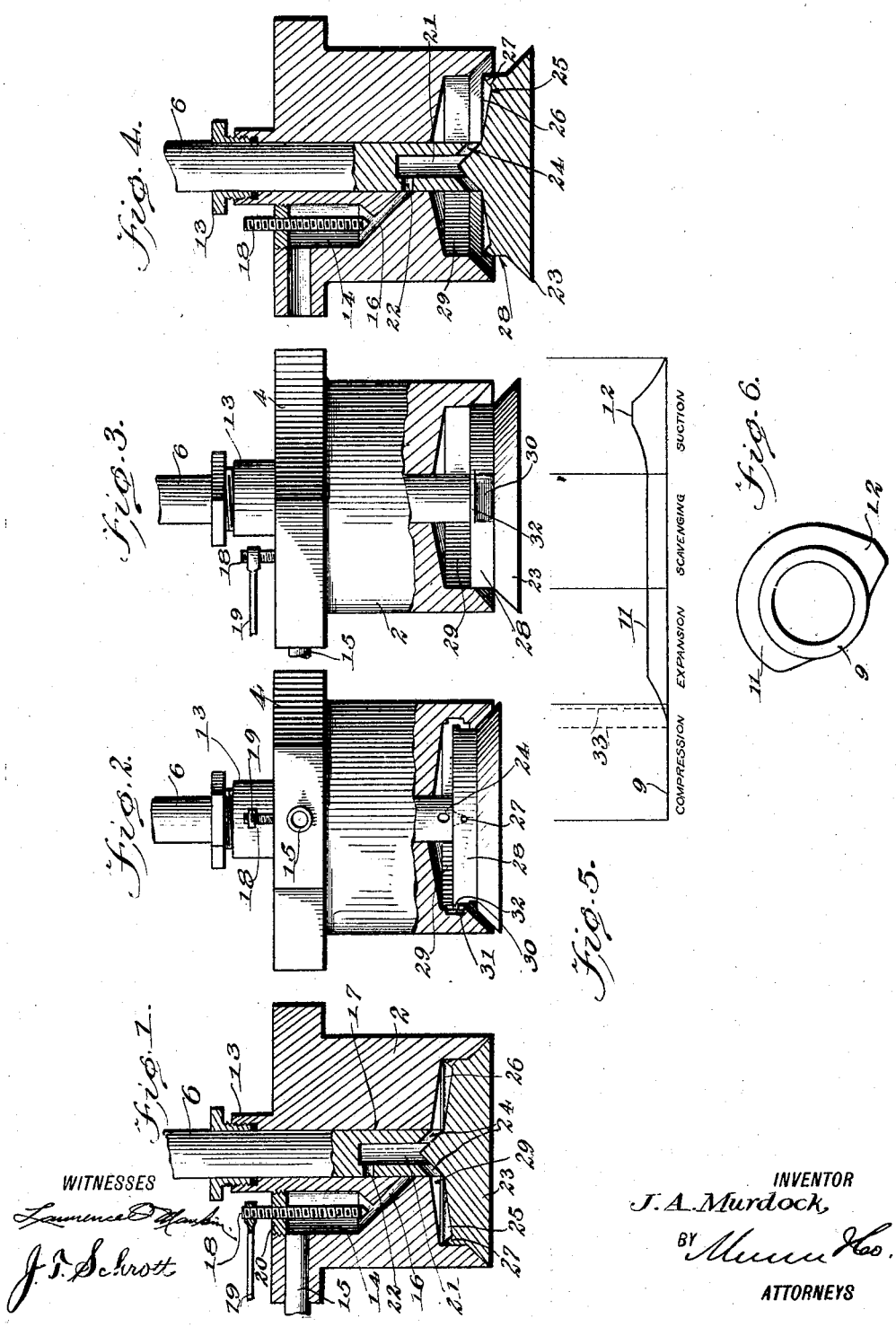

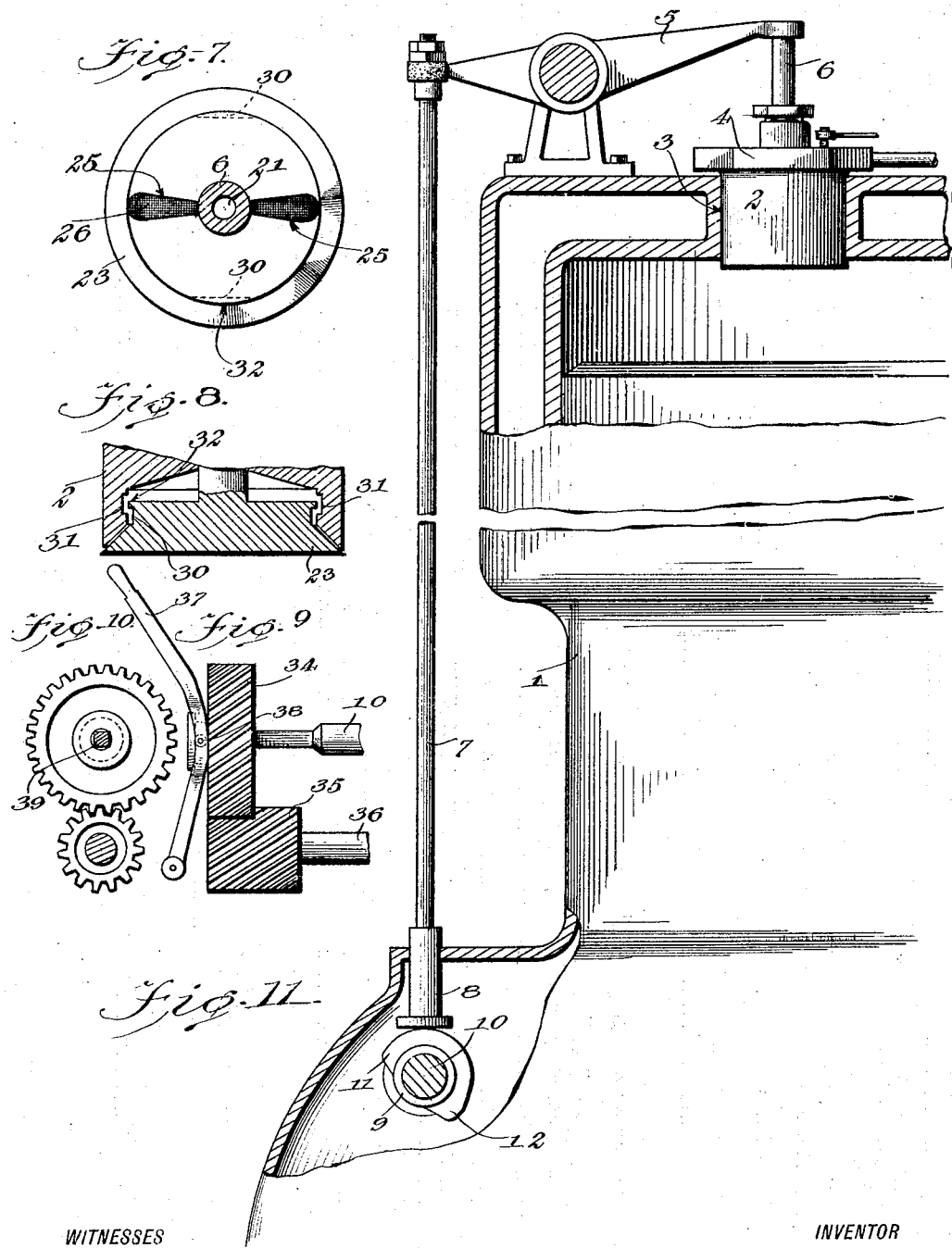

Patented Apr. 7, 1925.

1,532,512

UNITED STATES PATENT OFFICE.

JAMES ANDREW MURDOCK, OF TULSA, OKLAHOMA.

FUEL VALVE.

Application filed February 19, 1923. Serial No. 620,066.

*To all whom it may concern:*

Be it known that I, JAMES ANDREW MURDOCK, a citizen of the United States, and a resident of Tulsa, in the county of Tulsa and State of Oklahoma, have invented certain new and useful Improvements in Fuel Valves, of which the following is a specification.

My invention relates to improvements in internal combustion engines and it consists more particularly of an improvement in the valve which is adapted to supply the fuel to a Diesel type engine.

An object of the invention is to provide a valve the movements of which are co-ordinated with those of the engine to which it is applied, so that the functions of the engine are properly served.

A further object of the invention is to provide a valve which is adapted to initially open for the ignition of a small portion of oil, then fully open so that the rise of pressure attending such ignition may force the remainder of the oil into the cylinder where the balance of the combustion takes place.

Other objects and advantages will appear in the following specification, reference being had to the accompanying drawings, in which:—

Fig. 1 is a sectional view of the valve showing it in the closed position,

Fig. 2 is a side elevation with parts in section showing the position of the valve at the initial opening when hot air is admitted to the valve cage from the cylinder, Fig. 3 is a view similar to Fig. 2 but taken from a position 90° to one side, showing the valve in the next position, Fig. 4 is a section similar to Fig. 1 showing the valve fully open, Fig. 5 is a diagram illustrating a development of the valve-operating cam, Fig. 6 is a detail side elevation of the cam of which Fig. 5 is a development, Fig. 7 is a detail plan view of the valve head, the stem being shown in section, Fig. 8 is a detail cross section of the valve and portion of the valve cage, this view corresponding to the position in Fig. 2, Fig. 9 is a detail side elevation of the timing gears, Fig. 10 is a front elevation thereof, and Fig. 11 is a view of a portion of an engine illustrating the application of the improved valve.

Reference is made first to Fig. 11 wherein 1 is enough of a conventional type of engine to illustrate the application of the fuel valve. This valve includes the cage 2 which fits in a suitable bore 3 in the cylinder head. This cage has a non-circular flange 4 by means of which the cage may be gripped by a suitable implement for the removal of the cage and all of its carried parts.

In practice, the cage may be screwed in place in the bore. The drawings do not show it so because the manner in which the cage is applied to the engine cylinder is regarded as relatively immaterial. A rocker 5 actuates the stem 6 of the fuel valve. This rocker, in turn, is actuated by a tappet rod 7 which extends down into the crank case where the tappet 8 is periodically lifted by the cam 9 on the cam shaft 10.

The cam 9 includes a flange portion 11 which is concentric with the shaft until it meets the lobe 12 which is the highest part of the cam. A development of the cam would appear substantially as shown in Fig. 5, and the profile of the cam, as just described, is intended to govern the position of the fuel valve during the compression, expansion, scavenging and suction strokes of the engine 1.

Attention is next directed to Figs. 1 to 4. The valve cage 2 has a stuffing box 13 through which the stem 6 passes and which prevents the escape of gas from the engine cylinder. Situated at one side is a well 14. This well is kept supplied with fuel by a pipe 15. This pipe, in practice, leads to a suitable pump which, as is common in this art, delivers the fuel to the valve under pressure. A passage 16 conducts the oil from the well 14 to the bore 17 in which the stem 6 reciprocates, and while the stem is in the position shown in Figs. 1 and 2, the outlet of the passage 16 remains closed.

A needle valve 18 controls the amount of oil admitted to the passage 16, and consequently to the engine cylinder, from the well 14. This valve is adjusted by suitable means 19 which may consist of either a part of manually operated lever mechanism or of a connecting link to a suitable governor. Such governors are not uncommon in the art. Illustration of both a governor and other manual operating means is omitted because no restriction in either direction is desired. The purpose of the means 19 is to adjust the needle valve 18 and it is believed that this explanation is sufficient for present purposes.

A plug 20 carries the needle valve. This plug is removable so that access to the well 14 may be had. The needle valve itself is adjustable in this plug. Formed in the valve stem 6 is a chamber 21 which acts as an oil passage. It is adapted to hold a measured quantity of oil. This measured quantity of oil is introduced at a time when the lateral opening 22 (Fig. 4) is in registration with the outlet of the passage 16. The chamber 21 has an outlet to the top of the valve head 23 through oil ports 24. These are directed downwardly toward oil funnels 25 (Fig. 7) formed on top of the valve head. The oil funnels are covered by screens 26. Oil injection ports 37 lead from the funnels 25, and the screens 26 form a covering for the inner ends of the ports as well as of the funnels themselves.

The oil injection ports 27 communicate with the vertical cylindrical part 28 of the valve but are formed so that their axes are parallel to the beveled portion 23 of the valve. The purpose of this arrangement is to cause the injection of the oil directly into the cylinder where it immediately mingles with the hot compressed air and is thus prevented from reaching the wall of the cylinder where a chilling might possibly occur. The space 29 between the top of the valve 23 and the roof of the recessed portion of the cage 2 defines a primary combustion chamber where a small portion of oil is ignited upon entrance of hot air from the engine cylinder when the valve 23 makes the initial opening in Fig. 2.

At such a time air is admitted from the engine cylinder through ports (Figs. 2 and 8) which are formed by flattened places 30 on diametrically opposite sides of the valve 23 and bypasses 31 adjacent parts of the wall of the chamber 29. It is to be observed that communication through the air ports thus formed occurs only on the initial opening of the valve 23. When the valve passes to the position shown in Fig. 3, these ports will be closed because the ridges 32, which remain on the upper face of the valve, will occupy positions immediately beyond the passages 31 and so sever communication between the cylinder and chamber 29 so far as these air ports are concerned. The next position of the valve (Fig. 4) finds the chamber 29 in full communication with the engine cylinder, and also the oil well 14 in full communication with the chamber 21. A description of the positions of the valve 23 naturally leads to a description of the operation of the fuel valve in relation to the engine, and therefore attention is now directed to the operation:

Let the reader assume that the chamber 21 in the valve stem 6 has been filled with oil. This occurs when the valve 23 assumes the position in Fig. 4. Take the position in Fig. 1: Oil from the chamber 21 flows out of the ports 24 and over the screens 26 where most of it hangs in suspension above the funnels 25. The screens permit the oil to spread out in a thin film.

The oil injection ports 27 are closed, because the vertically sided portion 28 of the valve 23 is in position up within the correspondingly shaped portion of the chamber 29. The lateral opening 22, too, is closed, because it assumes a position well above the outlet of the passage 16. Assume the engine piston to be moving through the compression stroke. The tappet 8 (Fig. 11) then rests on the lowermost portion 9 of the cam. Fig. 5 may also be examined in this connection.

At the proper time during the aforesaid compression stroke of the piston, the portion 11 of the cam will move the rocker 5 (Fig. 11) and begin to open the valve 23 so that it assumes the positions in Figs. 2 and 8. The time of opening the valve 23 depends on the grade of fuel oil used. This opening of the valve is capable of adjustment by means of the timing gears in Figs. 9 and 10. Any variation in the time of opening of the valve 23 will occur in the region 33 in Fig. 5. The aforesaid adjustment is accomplished in this way.

The cam shaft 10 carries a gear 34 which meshes with a gear 35 on the crank shaft 36. A lever 37, which has a suitable connection at 38 with a collar carried by the gear 34, is adapted to slide this gear on the non-circular part 39 (Fig. 10) of the shaft 10. It is optional whether the gear 34 be made to slide on a non-circular part of the cam shaft 10 or upon a spiral key. In either case, the movement of the gear 34 causes a slight rotation of the cam shaft which shifts the relative position of the cam 9 with respect to the crank shaft. By this means of adjustment of the cam 9, and consequently of the time of opening of the valve 23, different grades of fuel may be used without danger of pre-ignition.

Upon slightly opening the valve 23, as described in connection with Figs. 2 and 8, hot compressed air from the engine cylinder rushes into the primary combustion chamber 29 through the air ports 30 and ignites a small portion of the oil. This causes an immediate increase in pressure, predominating even that in the engine cylinder. This action occurs while the valve is in the position in Fig. 2. But the valve does not stay in this position because it continues to move until it assumes the position in Fig. 3. This is the position the valve is forced to assume when the portion 11 of the cam rides under the tappet 8.

Immediately upon the valve 23 reaching the position in Fig. 3, the aforesaid increase of pressure in the primary combustion chamber 29 causes the remainder of the oil to be forced through the screens 26, out of the oil injection ports 27 and into the engine cylinder where the balance of the combustion takes place. The oil is compelled to pass through the screens 26 and ports 27 because the air ports 30 will be closed in the position in Fig. 3 by virtue of the ridges 32 meeting the inner surface of the valve cage immediately below the passages 31.

The valve 23 retains the position in Fig. 3 through the expansion and scavenging strokes (Fig. 5), and when the engine piston moves through the suction stroke, the lobe 12 of the cam causes the valve to open still farther so that it assumes the position in Fig. 4. This maximum opening of the valve remains for only a short time but long enough to permit filling of the chamber 21 with oil from the well 14 through the now communicating passage 16 and lateral opening 22. The partial vacuum which must be present in the engine cylinder during the aforesaid suction stroke is instrumental in assisting the prompt filling of the chamber 21. Most of the oil also runs out of the ports 24 upon the screens 26, whereupon the lobe 12 causes the valve to close in readiness for another cycle of operations. The valve is then in the position shown in Fig. 1.

By holding the valve 23 in the position in Fig. 3, until the end of the scavenging stroke (Fig. 5), scavenging of the primary chamber 29 is prevented, so that nothing but inert gases are trapped above the valve head after the valve closes (Fig. 1). This provision makes premature ignition impossible. Mention should be made of the fact that the size of the oil injection ports 27 will in practice vary with the size of the engine. It is quite obvious to the reader that the larger the engine the more copious must be the fuel supply and it is therefore only a matter of reason to readily understand that the ports 27 may vary in size from the round holes shown (Fig. 2) to longitudinal slits which may extend well over the vertical wall 28 of the valve.

In conclusion, there are several features of importance in the operation of the fuel valve which will bear emphasis. By spreading the oil in a thin film upon the screens 26 and then causing the preliminary explosion so that it strikes the oil from above and insures the forcing of all of the oil into the engine cylinder. The screens serve to pulverize the oil as it is forced through. Another feature of the screens is that they radiate the heat faster and stay cooler than the valve head, therefore by depositing the oil upon the screens instead of directly upon the valve head carbonizing is reduced.

While the construction and arrangement of the improved fuel valve as herein described and claimed, is that of a generally preferred form, obviously modifications and changes may be made without departing from the spirit of the invention or the scope of the claims.

I claim:—

1. A movable valve having means forming an oil chamber adapted to be filled upon the suction stroke of an engine to which the valve is applied, said chamber having an outlet, and a screen extending up to the outlet which permits oil to flow directly upon the screen thereby spreading most of the oil in a thin film in readiness for injection into the engine cylinder upon a subsequent expansion stroke.

2. A valve having an oil chamber with an outlet port and means formed to provide an oil funnel, and a screen covering the funnel and extending up to the port permitting oil to flow from the chamber onto the screen and spread out in a thin film above the funnel.

3. A valve having an oil chamber with an outlet port, means formed on the valve to provide an oil funnel said funnel having an oil injection port, and a screen fitted between the chamber outlet and the funnel and port through which screen and port oil from the funnel is adapted to be forced.

4. A valve having a fuel chamber with an outlet, means formed on the valve to provide a fuel funnel said funel having an injection port, a screen disposed between the outlet and said funnel to receive fuel from the chamber and spread it out in a thin film, a valve cage occupied by the valve which defines a combustion chamber, and a port on the valve adapted to admit air into said chamber upon a predetermined amount of movement of the valve to ignite some of the fuel on the screen preparatory to a discharge through said injection port.

5. A valve having an oil chamber with outlets, means formed on the valve to provide an oil funnel said chamber having an injection port, a screen disposed between the outlet and said funnel adapted to receive oil from the chamber and spread it out in a thin film, a cage occupied by the valve, closing said injection port but defining a combustion chamber; means on both the valve and cage adapted to provide an air port, and means to initially open the valve and admit air through the air port into the combustion chamber for the ignition of part of the oil, then open the valve further to uncover the injection port and close the air port, said ignited oil driving the rest of the oil through the screen and injection port for subsequent combustion.

6. A circular valve having a portion removed at the periphery to provide a passage but leave a ridge, a cage to seat the valve and having a portion removed to provide a corresponding passage, and means to move the valve in respect to the cage thereby bringing the passages into such relation as to define a port.

7. A valve having a wall with a portion removed to provide a passage but leave a ridge, a cage having a surface with which the wall contacts and which is provided with a corresponding passage, and means to initially move the valve to bring the passages in such relation as to define a port then move the valve farther to bring the ridge in contact with said cage surface beneath the cage passage and thus close the port.

8. A valve cage having a passage formed in an internal surface, a valve seated on the cage and having a corresponding passage in a wall which contacts with said surface, and means to move the valve adapted to first bring the passages in such relation as to define a port, then in such relation as to completely close the port and finally open the valve to such an extent as to provide a passage around the entire valve.

9. An internal combustion engine comprising a cylinder, a piston adapted to move on compression, expansion, scavenging and suction strokes, a fuel valve, and a cam adapted to partially open the valve at the end of the compression stroke, keep it open during the expansion and scavenging strokes, and fully open the valve during the suction stroke.

10. An internal combustion engine including a cylinder, a piston adapted to perform compression, expansion, scavenging and suction strokes, a fuel valve having an oil chamber, and a cam adapted to open the valve with the following successive results initially to open the valve for the admission of hot air at the end of the compression stroke to burn some of the oil and create a pressure greater than that in the cylinder, mix to open the valve a little farther during the expansion and scavenging strokes for the discharge and combustion of all of the oil in the cylinder and finally open the valve to the maximum during the suction stroke.

11. An internal combustion engine including a cylinder, a piston adapted to perform compression, expansion, scavenging and suction strokes, a fuel valve having an oil chamber, a cam adapted to open the valve with the following successive results initially to open the valve for the admission of hot air at the end of the compression stroke to burn some of the oil and create a pressure greater than that in the cylinder, next to open the valve a little farther during the expansion and scavenging strokes for the discharge and combustion of all of the oil in the cylinder and finally open the valve to the maximum during the suction stroke, and means for replenishing the valve chamber with oil during said suction stroke.

12. An internal combustion engine comprising a cylinder, a piston adapted to perform compression, expansion, scavenging and suction strokes, a fuel valve having an oil chamber, a cage containing the valve having an oil well adapted to supply the chamber, a cam shaft having a cam adapted to partially open the valve at the end of the compression stroke and maintain it partially open during the expansion and scavenging strokes initially admitting some of the hot air for igniting some of the oil then driving the rest of the oil into the cylinder by the increased pressure attending said ignition, said cam completely opening the valve during the suction stroke at which time the chamber is replenished by the well; and means for advancing or retarding the action of the cam so as to adapt the operation of the valve to various kinds of usable oils.

13. An internal combustion engine having a cylinder, a valve cage, a valve having a port, a screen covering the port over which oil is adapted to spread in a film, and means directing the force of an explosion upon ignition of the oil through the screen and port into the cylinder.

14. An internal combustion engine having a cylinder, a valve cage, a valve having a port, a screen covering the port and being adapted to spread oil in a thin film, and means for producing an explosion in the cage and against the oil from above forcing it through the screen and port into the cylinder.

JAMES ANDREW MURDOCK.